June 30, 1925.
M T SKINNER
1,543,882
WING SWEEP ATTACHMENT FOR PLOWS
Filed Oct. 1, 1923
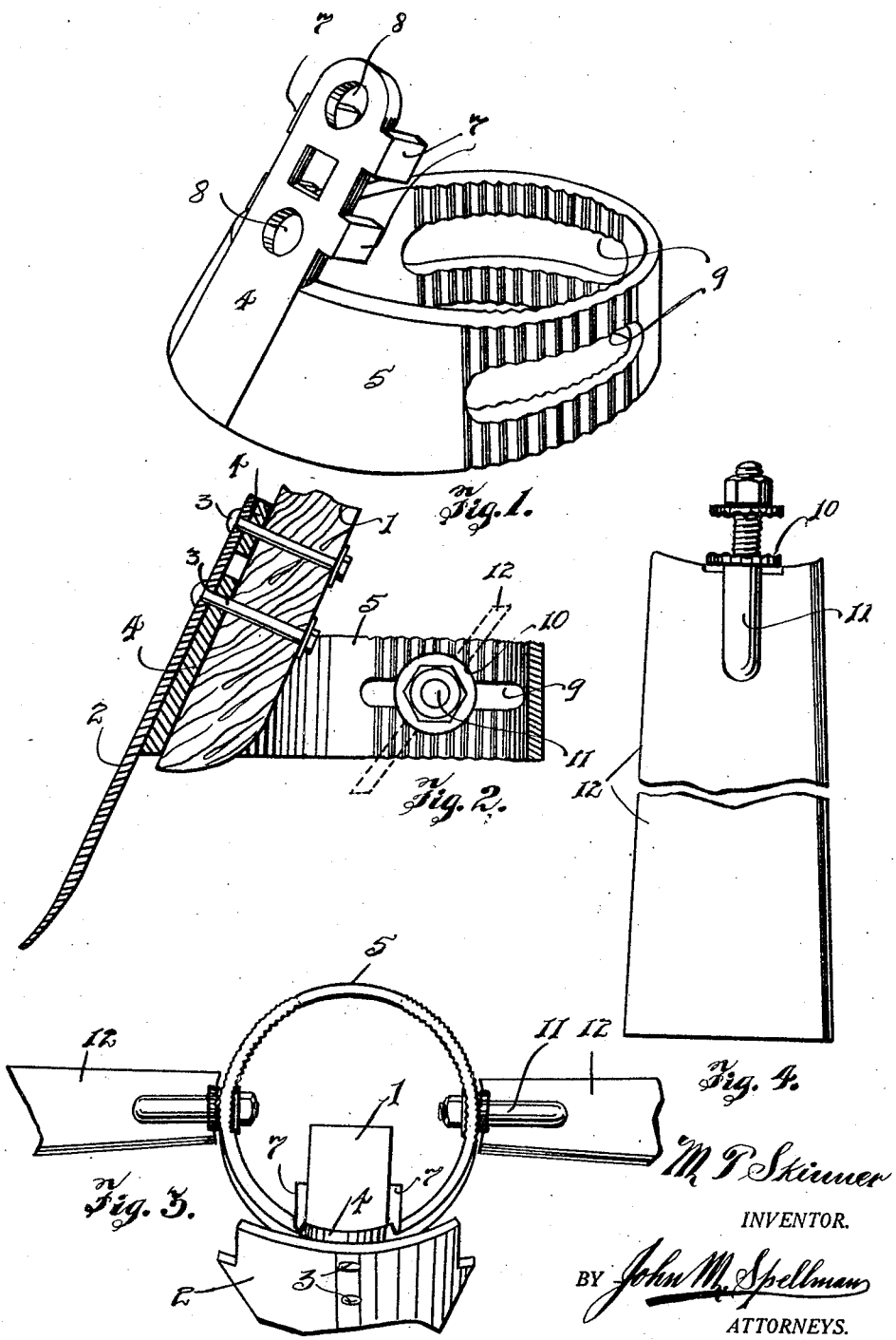

Patented June 30, 1925.

1,543,882

UNITED STATES PATENT OFFICE.

M T SKINNER, OF CLEBURNE, TEXAS, ASSIGNOR TO SKINNER HORSE-HOOF COMBINATION SWEEP COMPANY, A CORPORATION OF DELAWARE.

WING-SWEEP ATTACHMENT FOR PLOWS.

Application filed October 1, 1923. Serial No. 665,792.

*To all whom it may concern:*

Be it known that I, M T SKINNER, a citizen of the United States, residing at Cleburne, in the county of Johnston and State of Texas, have invented certain new and useful Improvements in Wing-Sweep Attachments for Plows, of which the following is a specification.

This invention relates to agricultural implements, more particularly to plows.

The principal object of the invention is to provide a wing sweep attachment for plows to permit such wings or blades to enter the soil at a desirable angle to cut vegetation and cultivate the soil uniformly.

Another object is to so arrange and construct the attachment as to prevent slipping on the plow standard.

A further object is the provision of means for securely fastening the blades or sweeps to the device at designated angles with respect to the ground.

Other and further improved features such as provision for fastening the device to plow blades of convex form to prevent weeds from catching thereon, etc., will be clearly understood by reference to the accompanying drawings, wherein:—

Figure 1 is a perspective view of a collar or band which is affixed to a plow standard to carry the wings or blades.

Figure 2 is a sectional view of the device in position on a plow standard.

Figure 3 is a top view of the attachment in position on a plow standard, with plow blades and wings partly broken away and illustrating one position of the wings, and, Figure 4 is an elevational view of one of the wings or blades, divided for convenience of illustration.

Proceeding in accordance with the accompanying drawings, the numeral 1 denotes the footpiece of a plow to which the plow share 2 is fastened by bolts 3—3.

Interposed between the plow share 2 and footpiece 1 is a tongue 4 forming part of a band or collar 5 which band carries the wings referred to later. It will be noticed that the tongue 4 is provided with lugs 7—7 directed inwardly at right angles to the tongue and on each side thereof. These lugs are for the purpose of holding the tongue in place to prevent its slipping on the footpiece. Openings 8—8 in the tongue are provided to receive the bolts 3—3.

The tongue 4 is slightly rounded on its outer face so that a plow share of convex form may be easily held in place thereon, the object being to prevent weeds and vegetation to move off and not hang on the plow share at the top where it fastens to the tongue. It will also be noted that the tongue 4 extends sufficiently upward from the collar that the wings 12—12 may go into the soil without advancing the share too far into the soil.

Referring to Figure 1, the collar or band 4 is provided with slots 9—9 and is corrugated both on the inner and outer peripheries. This is for the purpose of securely holding in place, a corrugated washer or washers 10—10, carried on the bolts 11—11. These bolts are means provided for attaching the wings 12—12 to the collar or band, clearly shown in Figure 3. By the arrangement of the corrugated inner and outer peripheries of the band or collar, the corrugated washers 10—10, together with the slots 9—9, the wings 12—12 may be disposed at the required angle for cultivation or cutting of vegetation and held securely in place.

The wings may thus occupy any forward or backward position within the radius of the slots in the collar.

Attention is also directed to the fact that the wings 14—14 are double edged, that is, both side edges are cutting edges, and due to this construction, when one edge is dulled, only a slight adjustment is required to reverse them to turn their opposite edges in cutting position.

What is claimed is:

1. In a wing sweep attachment for plows, a circular band having its front portion higher than the rear portion and said front portion provided with a tongue portion inclined inwardly and extended well beyond the band and provided with spaced lugs to secure the band in position on a plow; and means for attaching the wing sweeps to the band.

2. In a wing sweep attachment for plows, a circular band having its front portion provided with a tongue with lugs spaced apart and inwardly directed to hold the band in position on a plow; the inner and outer surfaces of the band being corrugated and provided with slots to receive the shank of the wing sweeps; said wing sweep shanks carrying a corrugated washer on each inner and outer band surface to engage with the band corrugations when advanced against the band to adjustably secure the sweeps in position.

3. In a wing sweep attachment for plows, a circular band, with slots and having its inner and outer surfaces corrugated, and a tongue portion on its forward part carrying inwardly directed lugs; wing sweeps with double edged blades the shanks of which are arranged to be received in said slots and corrugated surfaced washers adapted to be advanced on the shanks against the band corrugations to adjustably secure the sweeps in position.

In testimony whereof I have signed my name to this specification.

M T SKINNER.